US008666036B2

(12) United States Patent
Schwartz

(10) Patent No.: US 8,666,036 B2
(45) Date of Patent: *Mar. 4, 2014

(54) ALERT PROVISIONING SYSTEM AND METHOD

(76) Inventor: Paul M. Schwartz, West Bloomfield, MI (US)

( * ) Notice: Subject to any disclaimer, the term of this patent is extended or adjusted under 35 U.S.C. 154(b) by 342 days.

This patent is subject to a terminal disclaimer.

(21) Appl. No.: 13/282,617

(22) Filed: Oct. 27, 2011

(65) Prior Publication Data

US 2012/0278167 A1   Nov. 1, 2012

Related U.S. Application Data

(63) Continuation-in-part of application No. 11/419,659, filed on May 22, 2006, now Pat. No. 8,059,791, which is a continuation-in-part of application No. 11/088,051, filed on Mar. 23, 2005, now abandoned.

(51) Int. Cl.
*H04M 1/64* (2006.01)
*H04M 3/42* (2006.01)

(52) U.S. Cl.
USPC ............................... 379/88.12; 455/414.1

(58) Field of Classification Search
USPC ......... 379/207; 455/415; 340/309.16, 539.13; 701/201
See application file for complete search history.

(56) References Cited

U.S. PATENT DOCUMENTS

| | | |
|---|---|---|
| 5,999,599 A | 12/1999 | Shaffer et al. |
| 6,052,438 A | 4/2000 | Wu et al. |
| 6,298,132 B1 | 10/2001 | Harada et al. |
| 6,351,639 B1 | 2/2002 | Motohashi |
| 6,430,624 B1 | 8/2002 | Jamtgaard et al. |
| 6,519,326 B1 | 2/2003 | Milewski et al. |
| 6,741,188 B1 | 5/2004 | Miller et al. |
| 6,901,139 B2 | 5/2005 | Gonzalez et al. |
| 7,084,758 B1 | 8/2006 | Cole |
| 7,272,498 B2 | 9/2007 | Singh |
| 7,542,773 B2 | 6/2009 | Koch |
| 7,729,487 B2 | 6/2010 | Koch |
| 7,737,861 B2 | 6/2010 | Lea et al. |
| 7,738,861 B2 | 6/2010 | Fournier |
| 7,751,534 B2 | 7/2010 | Sun |
| 2004/0120494 A1 | 6/2004 | Jiang |
| 2004/0207522 A1 | 10/2004 | McGee et al. |
| 2006/0058019 A1 | 3/2006 | Chan |
| 2006/0058043 A1 | 3/2006 | Miyauchi |
| 2006/0058044 A1 | 3/2006 | Horvath |
| 2006/0271281 A1 | 11/2006 | Ahn et al. |
| 2007/0202925 A1 | 8/2007 | Beith |
| 2007/0207782 A1 | 9/2007 | Tran |

*Primary Examiner* — Mohammad Islam

(57) ABSTRACT

An alert method and system permits an alert to be provided to a subscriber. Such alerts may comprise icons or graphical advertising units that may be navigated by the subscriber to trigger and initiate corresponding and dynamically updatable communications and communication links.

10 Claims, 5 Drawing Sheets

ALERT PROVISIONING SYSTEM AND METHOD

CROSS-REFERENCE TO RELATED APPLICATIONS

This application is a continuation-in-part of U.S. patent application Ser. No. 11/419,659 filed May 22, 2006 now U.S. Pat. No. 8,059,791, the disclosure of which is incorporated in its entirety, which is a continuation-in-part of U.S. patent application Ser. No. 11/088,051 filed Mar. 23, 2005 now abandoned, the disclosure of which is also incorporated in its entirety.

TECHNICAL FIELD

This invention relates generally to communication systems and more particularly to an alert provisioning system implemented as an alert provisioning service of a communication service provider.

BACKGROUND ART

Messaging systems have been proposed and implemented for use with mobile telephones to provide targeted SMS text advertisements to consenting subscribers. "MoBull Messenger", for example, is a free wireless discount coupon and notification service launched by the University of South Florida and Air2Web in 2002. The MoBull service allows students to sign up for discount coupons from area restaurants, sporting events, nightclubs and retail stores. Registered vendors access their accounts through web interfaces to select desired discounts and target groups of registered subscribers defined by age and geographic location. The vendor may thereafter confirm the price per message, the number of messages being sent, and charge the amount on their credit card. SMS text message coupons are then generated and sent out to the respective subscribers' cell phone, PDA or pager as instructed. See, Air2Web U.S. Pat. No. 6,430,624 to Jamtgaard et al. issued Aug. 6, 2003.

Messaging systems have similarly been proposed for use with wireless fidelity (Wi-Fi) devices to provide targeted ads to consenting subscribers. In or about 2005, for example, Google, Inc., announced its intention to blanket the San Francisco, Calif. area with Wi-Fi coverage, offering free wireless Internet access to those who agree to accept beamed ads from local businesses on their wireless devices. See, Google Published Patent Application Nos. 20060058019, 20060058043 and 20060058044.

Heretofore, all such messaging systems have thus been limited to SMS text messages or Wi-Fi advertisements that require either actual or constructive subscriber consent. Such messages/advertisements, although precisely targeted, are both static and highly invasive.

Consequently, a need exists for a system and method for providing targeted, location-based, yet non-invasive, messages/advertisements to communication system subscribers that may be selected and customized by subscribers, service providers and/or third parties and which may be automatically deleted, blocked and/or dynamically updated following predetermined times or events. The messages/advertisements may be provided to a subscriber at the time of placing a call, the time of receiving a call, based on the location of the subscriber, the location of one or more third parties, or any other suitable time.

DISCLOSURE OF INVENTION

It is a principal object of the present invention to provide a system and method for a communication service provider to provide an alert to a subscriber for display on a corresponding communication device and which functions to provide the subscriber with targeted, location-based messages, including, but not limited to advertisements, from the communication service provider, the subscriber, or any third party.

It is a further object of the present invention to provide such a system and method wherein the alert is provided to the subscriber based on the determined location of the subscriber relative to the determined location of one or more third parties or objects, including moveable or mobile objects such as a vehicle or mobile device.

It is a further object of the present invention to provide such a system and method wherein the alert displayed on a subscriber communication device functions as an image that may be selectively navigated by the subscriber to trigger the corresponding communication such as an advertisement or message.

It is a further object of the present invention to provide such a system and method wherein the alert is provided to the subscriber based on the purchasing activity of one or more third parties.

It is still further an object of the present invention to provide such a system and method wherein the aforementioned images and corresponding communications may be locally or remotely stored in the communication device or network, respectively, and wherein they may be individually or collectively automatically updated, blocked or deleted following predetermined times or events.

In carrying out these and other objects, features and advantages of the present invention, there is provided an alert provisioning system which may be implemented as an alert provisioning service of a communication service provider such as, for example, but without limitation, a wired or wireless telephone service provider, wireless local area network (WLAN) service provider, television service provider (cable, satellite, etc.), or a Global Positioning System (GPS) service provider. The provisioning system comprises a service node operable to generate a signaling message including an image such as a graphic, graphical advertising unit, or other suitable designation that may be displayed on a subscriber communication device. The displayed designation functions to identify and/or promote the communication provider, a subscriber, or a third party. In a preferred embodiment, the designation further functions as an icon such as a logo that may be selectively navigated by the subscriber to trigger a corresponding communication such as an advertisement or message. A processor may provide the communication with the icon at any suitable time in accordance with the subscriber profile, including, but no limited to, as part of a signaling message. Still further, upon navigation by a subscriber, the icon may trigger generation and real-time delivery of a current corresponding message such as an SMS text message, MMS message, audio message, graphical advertising unit, etc. Such communication may take any suitable form including, without limitation, a media file, audio file, text, or any combination thereof. The processor is further operative to store the icon and/or corresponding communication for subsequent retrieval/initiation. In a preferred embodiment, the processor may also function to automatically delete, block or update the icon and/or communication following a predetermined time or event.

In further carrying out the above objects, features and advantages of the present invention, there is also provided a communication device for use with the above-described system. The device comprises a controller operative to navigate an image such as an icon or graphical advertising unit provided to a subscriber by a communication service provider such as a telephone service provider, and displayed on the device. The device further comprises a processor operative to initiate a corresponding communication, and a storage unit for selectively storing the icon and/or the communication. Still further, the processor may function to receive the icon and/or corresponding communication (selectively or automatically) from a secondary communication device or set of devices for subsequent storage and/or retrieval. The communication may provide an advertisement, reminder, public service message, etc.

BEST MODE FOR CARRYING OUT THE INVENTION

Figure 1:
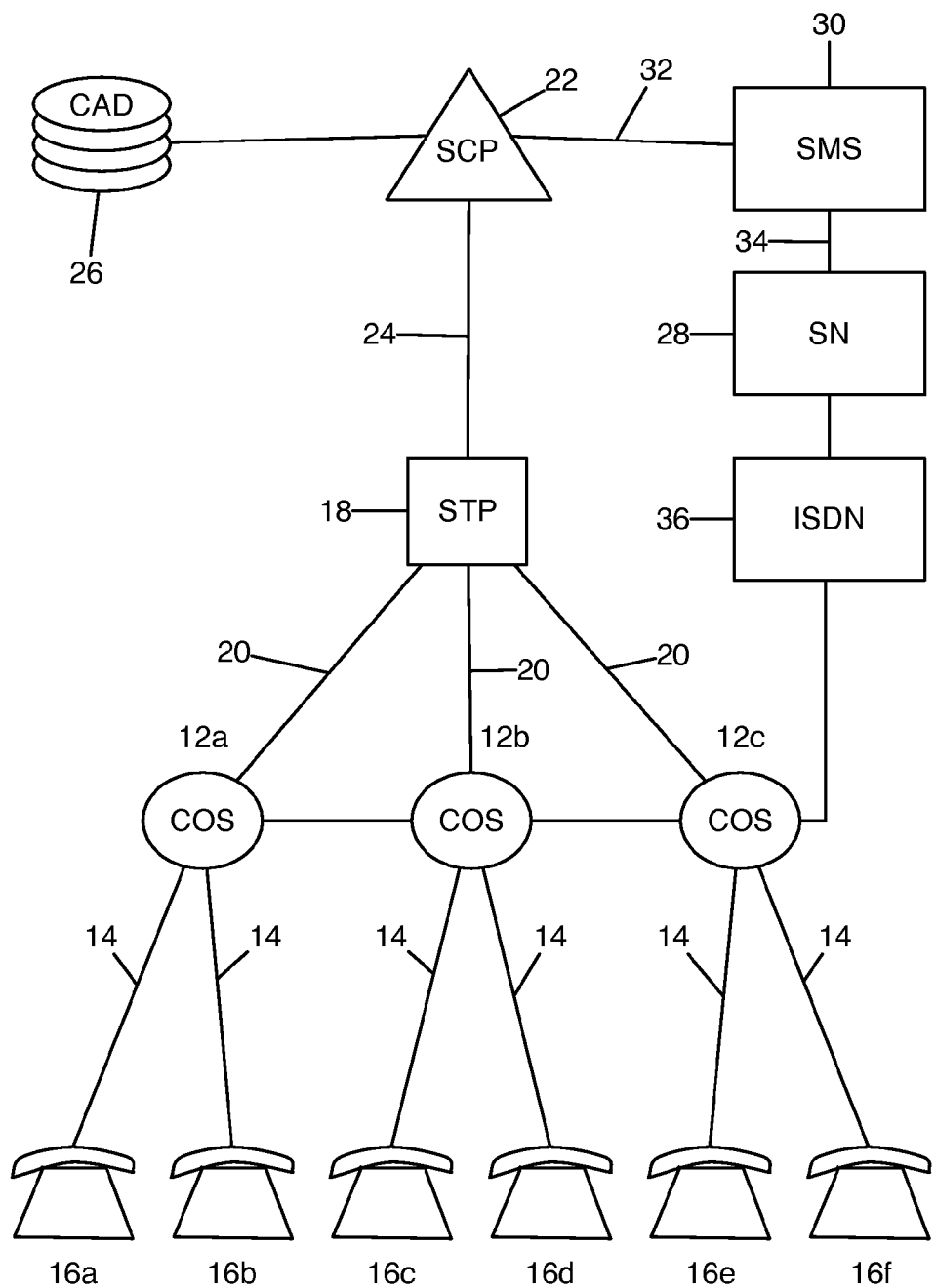
FIG. 1 is a schematic diagram illustrating a preferred environment for a wireline telecommunications network incorporating the present invention.

With reference to FIG. 1 of the drawings, there is shown a schematic diagram of a preferred embodiment for a wireline telecommunications network incorporating the present invention which is generally designated by reference numeral 10. As will be described below, the present invention is directed to a system and method for delivery of targeted, non-invasive, messages/advertisements to communication service subscribers. Accordingly, in a preferred embodiment, wireline network 10, also called a "land line" telephone network, may utilize Advanced Intelligent Network (AIN) elements and functionality of a typical Local Exchange Carrier (LEC). It is understood and contemplated by Applicants, however, that any suitable communication network and/or combination of network elements may be used to implement the present invention. Thus the communication network may comprise, for example, the Public Switched Telephone Network (PSTN), An Integrated Services Digital Network (ISDN), the public Internet (also called the "World Wide Web" or WWW) including emerging Voice over Internet Protocol (VoIP) applications (generally referred to as "Internet Telephony"), a WLAN, a GPS network or system, a television network or system (cable, satellite, etc.), as well as any other collection of interconnected computers or termination equipment which communicate with one another in accordance with a common protocol. Such a protocol may comprise, for example, the Internet Protocol (IP) that specifies the format of packets or "datagrams" and provides an addressing scheme as well as the Transmission Control Protocol (TCP) that may be used to establish a virtual connection at a higher level between a destination and a source. TCP/IP thus establishes a connection between two hosts (computer systems accessed by remote users to obtain data) so as to send and receive messages.

Still referring to FIG. 1, Network 10 in the preferred embodiment illustrated, includes a plurality of end or central offices 12a, 12b, and 12c. These central offices, which are also referred to as central offices or Central Office Switches (COS) each preferably, but not necessarily, include a Service Switching Point (SSP)(not shown) or SSP functionality. As those skilled in the art will recognize, a SSP is a switch that includes intelligent network functionality (hardware and/or software) which together function to detect predetermined conditions and initiate corresponding network triggers. For example, an SSP may initiate a trigger for a predetermined state of a call on a subscriber's directory number, generate the trigger in the form of a data query to be sent over the network, and suspend call processing until the SSP receives responsive instructions from the network to take specific action.

As further illustrated in FIG. 1, central offices 12a-c each include a plurality of subscriber lines 14 which, in turn, are each connected to Customer Premises Equipment (CPE) devices ("terminating equipment") such as telephones 16a, 16b, 16c, 16d, 16e and 16f. Any suitable communication device may, of course be used in place or of in addition to telephones 16a-f including, without limitation, one or more computers or other wired or wireless devices. Each CPE device 16 is assigned a Directory Number (DN). As used herein, the Directory Number (commonly called the telephone number or calling number) is a unique network address that is assigned to a telephone or other CPE device (and thus the user or subscriber) for routing calls. More simply, the DN is a set of numbers that must be dialed (the digits which must be sent) by a calling party to terminate a call to one or more CPE devices 16 in the network 10. As those skilled in the art will recognize, a call is said to "terminate" when the above digits are sent and a connection is finally made between a calling party and called party following call processing.

Still referring to FIG. 1, each of the central offices 12a-c in network 10 is typically provided in communication with a serving Signal Transfer Point (STP) 18. In the AIN network of the preferred embodiment illustrated, such communication is provided via respective Circuit Signaling System 7 (CCS7) data links 20. A Signal Transfer Point is a switch that provides for the transfer from one signaling link to another. More specifically, in a CCS network such as network 10, herein, STP 18 is a packet switching device that performs a message routing function. More specifically, it functions to receive, discriminate, and transfer CCS7 messages between the signaling points to which it is connected (here central offices 12a-c and SCP 22). Although shown as a separate network element, the STP functionality may, of course, also reside within one or more central offices 12a-c or other suitable network components.

As shown, STP 18 is provided in communication with a Service Control Point (SCP) 22 via a CCS7 link 24. In an intelligent network such as AIN network 10, a service control point implements a service control function and may include one or more subscriber datalogs or databases for identifying network service subscribers as well as the particular services to be provided to such subscribers. A CNAM database is an example of such a subscriber database. The Visual Alert Database (VAD) 26 of the present invention is a further example. As discussed below, the visual alert database 26 is provisioned to include, by way of a look-up table or other suitable means, relevant information such as calling party name/directory number, called party name/directory number and specified visual alerts (images and/or icons as well as corresponding communications or links thereto) to be provided to selected called parties and calling parties, respectively. SCP 22 is further provided in communication with a Service Node (SN) 28 via a Service Management System 30 through respective CCS7 data links 32 and 34. Service Management System 30 functions to update the SCP databases (e.g. CAD 26) and other network databases and elements (e.g. Service Node 28).

With reference still to FIG. 1, SN 28 is a network element having computing capability and database maintenance features. Depending on the application, it may also include switching fabric, voice and Dual Tone Multi-Frequency (DTMF) signal recognition functionality as well as voice synthesis functionality and/or devices. As those skilled in the art will recognize, service nodes have similar functionality to service control points (which are time consuming and expensive to modify) and are typically used where a new or enhanced feature is desired to be implemented. Service nodes are thus used when a feature or service requires user interaction or transfer of a significant amount of data to a subscriber over a switch connection. Service nodes are similarly used for implementing services that require real-time communications with a subscriber during a communication. A service node (here SN 28) is typically connected to one or more switches such as central offices 12a-c via an ISDN link 36.

Figure 2:
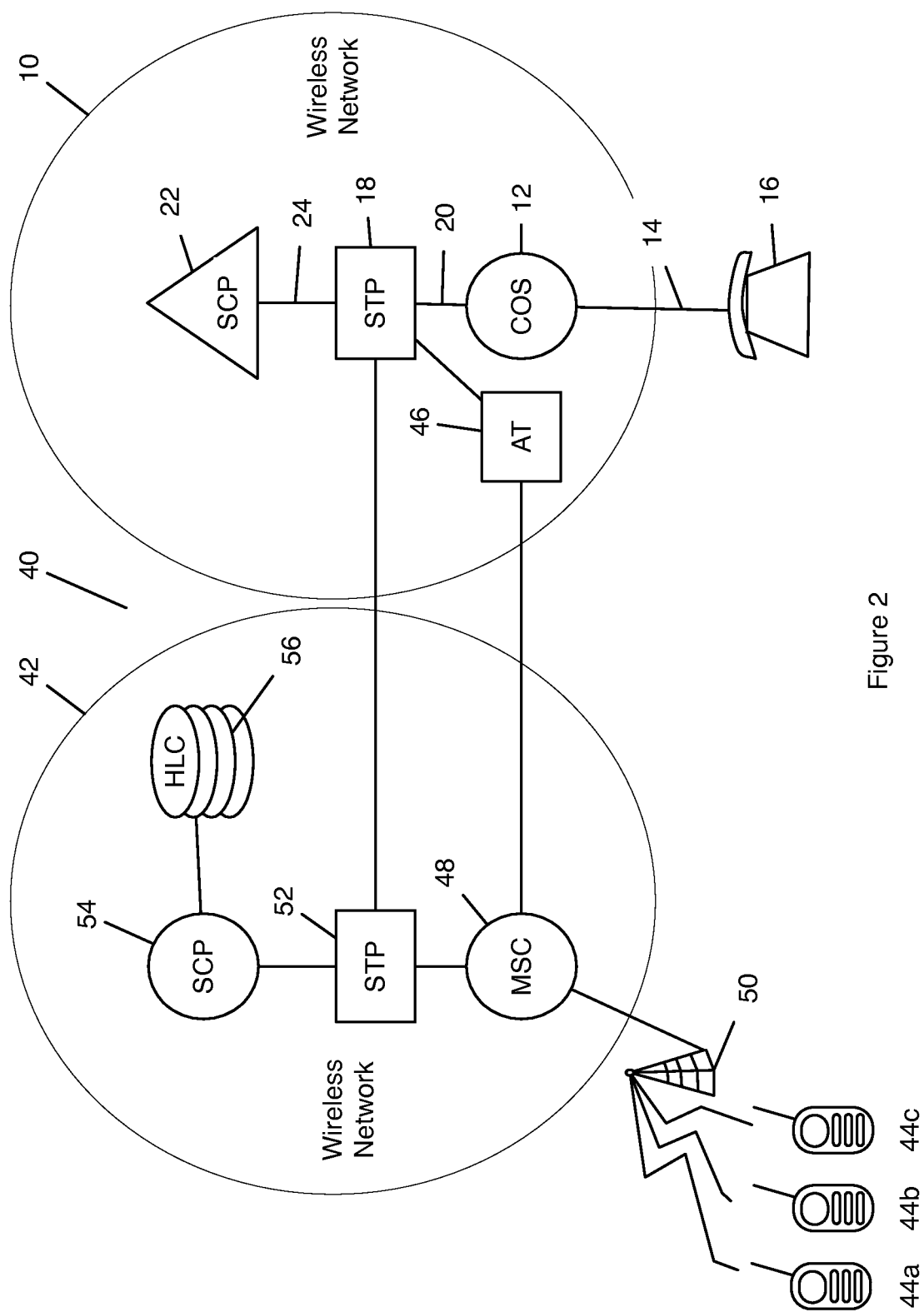
FIG. 2 is schematic diagram illustrating a preferred environment for a communication network incorporating the present invention.

FIG. 2 of the drawings provides a schematic of a communications system designated generally by reference numeral 40 and including a "wireless" or mobile telephone network 42 provided in communication with a wireline network 10 such as that shown and described in FIG. 1 above. Wireline network 10 thus includes one or more end offices or central offices 12 that, as previously discussed, may include SSP functionality or be provided in communication with SSP components. As discussed above, each central office 12 is provided in communication with and serves one or more subscriber lines or telephone lines 14. As shown in FIG. 2, a representative calling line 14 is thus served by central office 12 and is further provided in communication with terminating equipment such as CPE device ("telephone") 16. Central office 12 is further provided in communication with STP 18 and SCP 22 via CCS7 data links 20 and 24, respectively.

Wireless network 42 may comprise any suitable mobile network such as, for example, a cellular system, a Personal Communications Service (PCS) system, a Global Standard for Mobile communications (GSM) system, a Wireless Intelligent Network (WIN), a Wireless Local Area Network (WLAN) such as a mesh network, Wireless Fidelity network (Commonly termed Wi-Fi, including, but not limited to, any type of 802.11 network, whether 802.11b, 802.11a, dual-band, etc.), 5 g, 4 g, 3 g wireless network, 2.5 g wireless network, satellite system or network such as a GPS network or television network, or any or other system wherein radio technology is used in communications. A communication device operating in wireless network 42 may thus comprise and be referred to as a wireless unit, a Wireless Communication Unit (WCU), a mobile phone, a cellular phone, etc. For ease of reference, wireless units 44a, 44b, and 44c of FIG. 2 will be referred to as mobile telephones.

Still referring to FIG. 2, wireless network 42 may be provided in communication with wireline network 10 in a variety of ways. For exemplary purposes, wireless network 42 is thus shown connected to wireline network 10 through an access tandem 46. As shown, access tandem 46 is provided in communication with a Mobile Switching Center (MSC) 48 (also called a mobile switch) on the wireless side as well as STP 18 and COS 12 on the wireline side. As those skilled in the art will recognize, an MSC performs similar functionality to a wireline network switch by directing communications to and from terminating equipment (here mobile phones 44a, 44b, 44c etc.) An MSC typically stores or has access to information about wireless units operating within an area served by the MSC through a plurality of location registers (not shown) including, for example, a Home Location Register (HLR) and a Visitor Location Register (VLR). An HLR includes information relating to wireless units that are considered "home" units to the MSC. Similarly, a VLR is populated with information relating to wireless units that are visiting i.e. "roaming" in a coverage area of the particular MSC. An MSC such as MSC 48 of FIG. 2 is typically provided in communication with one or more base stations or transceivers 50. Base stations 50 use radio technology to communicate (send and receive voice and data) with wireless units (mobile phones 44a-c) operating within the range of the base station.

Wireless network 42, like wireline network 10, similarly includes an STP 52 that is provided in communication with MSC 48 and an SCP 54. In a wireless network, an SCP is generally an intelligent network element such as an Intelligent Peripheral (IP) which includes service package applications (SPAs), programming, and similar information necessary to implement communication and other services to subscribers. As in the wireline network 10, SCP 54 may also include or have access to databases, tables (e.g. look up tables), or other information relating to subscribers that may be helpful in the implementation of the communications and services. Thus, SCP 54 in wireless network 42 is provided in communication with or includes the functionality of a location register and more particularly a Home Location Register (HLR) 56. The functionality of HLR 56 may also be included in one or more other network elements such as, for example, MSC 48. Regardless whether HLR 56 is implemented as a separate network component or included as functionality in an existing component, it stores information regarding wireless units (here mobile phones 44a-c) that are considered "home" units to MSC 48. Of course, HLR 56 may also include entries for wireless units that are considered "home" units to other MSCs (not shown) as well. Thus, it is anticipated that a single HLR or HLR functionality provided on one or more network components may service multiple MSCs in the wireless network.

As discussed below in further detail, in a preferred embodiment of the present invention, HLR 56 may therefore be provisioned by way of a look-up table or other suitable storage means to include information necessary for the implementation of the alert service of the present invention. Such information may include calling party name/directory number, called party name/directory number and specified alerts (referred to herein as images, graphical advertising units and/or icons and corresponding communications or links) to be provided to select called parties and/or calling parties.

In keeping with the invention, navigable alert information may be provided to a subscriber at any suitable time based on the subscriber's profile and distribution criteria set by the subscriber, the network provider and/or one or more third parties such as advertisers. The distribution criteria may include any suitable rules and be based on any suitable information, including, but not limited to, landline or wireless unit position, proximity to a static or dynamic geographic reference point of a predefined group of network subscribers and/or a predetermined number of network subscribers (or amount of corresponding network traffic), data transmissions sent or received by the subscriber on an associated device or system (including a device or system different from the respective landline or wireless unit), including subscriber web browsing history as well as content of select email, text messages, and instant messages, actual or predicted (based on historical user activity) proximity to a geographic reference point, subscriber membership or participation in social networking groups and services, including subscriber connections and content of messages posted or received by the subscriber.

The alerts are automatically provided to corresponding subscriber wireless units and are automatically displayable on each wireless unit as unique corresponding images/icons such as logos or graphical advertising units. Each alert may be ignored or selectively navigated by the subscriber (directly by touching or clicking on the icon, or indirectly using voice navigation and artificial intelligence applications and/or natural language processing) to initiate and subsequently provide a corresponding message or advertisement. In further keeping with the invention, each such message or advertisement is specifically targeted to the subscriber based on the corresponding subscriber profile and distribution criteria. Still further, the message or advertisement, which may comprise or include a coupon for a discount on corresponding products or services, may be stored on the wireless unit either automatically or at the option of the user.

An exemplary embodiment of the present invention provides for the storage of or access to images/icons and corresponding communications related to persons and entities associated with selected terminating equipment in both wireless and wireline networks. FIGS. 1 and 2 illustrate preferred embodiments of such networks and include AIN components and functionality. Again, however, it is understood that any suitable network or collection of network components may be utilized, including, without limitation, the Public Switched Telephone Network (PSTN), Integrated Digital Services Network (IDSN), the public Internet and private internets on the wireline side, as well as mesh networks, PCS networks, Wi-Fi networks, GPS networks and systems, etc. on the wireless side.

FIGS. 1 and 2 illustrate preferred embodiments wherein alert information is provided to a subscriber at the time of making or receiving a call on a corresponding landline or wireless unit. It is understood, however, that these embodiments described in the following sections as Provisioning for Calling Party Alerts and Provisioning for Called Party Alerts, are for exemplary purposes only, as such alerts may be provided to any subscriber at any suitable time, regardless if a call is being made or received.

Provisioning for Calling Party Alerts
Wireline Networks

Referring first to FIG. 1 of the drawings, the functionality for delivering alert information to a called party will be described. As discussed above, FIG. 1 illustrates an exemplary embodiment including an information database 26 as a preferred source of information. In operation, database 26 may be provisioned (i.e "populated") by a user or subscriber associated with a telephone 16a-f (as well any third party, including the communication service provider) to include selected visual alerts such as images or navigable icons or graphical advertising units (and corresponding communications or links thereto) to be provided to a called party. Such visual alert information may be provisioned at the time of set up of the calling party termination equipment, on a call-by-call basis, or any other suitable time. In keeping with the invention and discussed below, it is, therefore, understood that database 26 may be provisioned by a user (here a calling party) to provide selected visual alerts to selected called parties as part of a subscriber's profile. Database 26 may similarly be provisioned to dynamically assign and provide such visual alerts (i.e. images, icons, etc.) and communications or links thereto "on the fly".

As an example of such provisioning and operation, assume that a calling party or "user" (also called a "subscriber") associated with telephone 16a has provisioned the user's profile to include a selected visual alert to be provided to a called party associated with telephone 16e. The visual alert may, of course, be provided to the "called party" at any time. In the example herein described, however, the alert is provided to the called party on a call termination attempt where both parties are subscribers to a corresponding visual alert service that, at the threshold, permits the required visual alert provisioning. The calling party 16a begins by placing a call (sending digits) associated with a directory number of the called party. Once the call is placed, a communication is received at the serving central office and or SSP, of the calling party, here central office switch 12a. Central office 12a, and more particularly, an associated SSP or SSP functionality of switch 12a obtains routing information and populates an Initial Address Message (IAM) with selected information. The IAM is a parameter that exists within an Integrated Services Digital Network User Part (ISUP) signaling message. The ISUP signaling message employs a CCS7 call setup protocol. Specifically, the IAM is populated with the calling party directory number and the called party directory number. The details of the query package are well known to those skilled in the art and, accordingly, need not be discussed here in detail.

Central office 12a sends this information in the signaling message to an end office 12c serving telephone 16e and thus the called party associated with telephone 16e. Office 12c recognizes that the call is for a visual alert service subscriber and, accordingly, halts or "suspends" call processing and launches a called party alert query on the CCS7 network 10. More specifically, an SSP (or the SSP functionality of switch 12c) detects a trigger which was set in the SSP in association with the telephone number of telephone 16e (i.e. the called telephone number). The trigger recognizes that the called party subscribes to an alert service. Alternatively, the calling party may, in addition to dialing the called party directory number, enter a predetermined code or codes (e.g. *xx) that have been specifically provisioned in the above SSP with a visual alert service trigger. Regardless of how the SSP trigger is implemented and/or detected, the SSP functions to launch a query (a "called party alert" query) via a serving STP, here STP 18 to an associated network element such as SCP 22, for instructions on how to proceed with the call. More specifically, the SSP populates routing parameters in a suitable query package with routing and code specific information associated with AIN elements and services, as well as directory numbers associated with the calling party 16a and the called party 16e. As part of the query launch, central office 12c populates a called party address parameter in the query with the calling party's directory number. The called party address parameter is a routing parameter within an AIN query package.

Again, the details of the query message are well know to those skilled in the art and need not be discussed here in detail. By way of overview, however, the query package may include parameters such as a Message Transfer Part (MTP) including a routing label consisting of an Originating Point Code (OPC) and a Destination Point Code (DPC). The query package may further include a Signaling Connection Control Part (SCCP) containing a Global Title (calling party address parameter and called party address parameter). Still further, the query package may include a TCAP parameter which is a data field including call data for database services as well as a trigger type which functions to identify the types of triggers detected by the SSP. The TCAP parameter may also include one or more service keys that may be set to specific operations codes that may be sent by a user to initiate a selected service.

After office 12c has populated the called party address parameter, the called party alert query is sent to STP 18. Upon receipt of the above discussed query package (including all relevant routing parameters), STP 18 reformats the package with final routing information. More specifically, STP 18 performs a Global Title Translation (GTT) and changes the DPC of the message so that the query package is routed to the appropriate SCP, here SCP 22. The STP 18 may also change a Subsystem Number (SSN) to enable a specific service package (e.g. the visual alert service package) to be accessed within a subsystem of the SCP 22. As those skilled in the art are aware, service package applications are service packages for AIN services that are located within an SCP, here SCP 22, and are capable of processing several communications at the same time.

In the preferred embodiment illustrated in FIG. 1, the SSN is changed so that the alert service of the present invention is accessed when the SCP 22 receives the above query package. Once accessed, the visual alert delivery service performs a database look-up via CAD 26 using the calling party telephone number to access the visual alert service profile of the calling party. More specifically, the service locates and cross-references the called party directory number with a selected visual alert. i.e. a selected image or icon. The association between the calling party directory number and/or name and the information corresponding to the call alert preferences for the called party may be accomplished in any suitable way. For example, the calling party directory number or directory name may simply include the information as part of the entry as discussed above. Alternatively, the calling party directory number or directory name may serve as a pointer, flag etc. or include a pointer, flag etc. to another storage medium such as a datalog, database, table or the like. As discussed herein, the user profile may be provisioned and/or updated with such information in advance of the call termination attempt or contemporaneous with the call. Where provisioning is contemporaneous, however, it is understood that additional queries may be required to be launched to request or receive information from the calling party.

In keeping with the invention, after the STP 18 performs the GTT, the query package is sent to the SCP 22. The SCP 22 sends a call alert message to the SSP 12*c* in a TCAP response. The TCAP response is the final message containing instructions on how to handle the call and ends the SSP/SCP transaction that was initiated with the call alert query. In the example discussed, the TCAP response includes the identification of a specific visual alert to be provided to the called party 16*e*. As discussed above the visual alert may comprise any suitable image intended for display on a subscriber communication device, including, without limitation, any fixed or moving image such as a logo, video clip, etc. which functions to uniquely identify and/or promote the calling party, network provider or third party. Such alert may also be selected in advance or dynamically assigned based on any suitable criteria such as the calling party's geographic location, the called party's geographic location, etc. The visual alert may similarly comprise an icon or graphical advertising unit that, in addition to or in place of providing the identification and/or promotion functions described above, is navigable by the called party to trigger a corresponding communication such as a personal message, advertisement or public service message. Such communication may comprise any suitable form including, without limitation, a media file, text, SMS text message, or any combination thereof. Again, the communication may similarly be selected in advance or dynamically assigned based on time of the day, day of the week, the calling party's geographic location, the called party's geographic location, historical subscriber actions (e.g. purchasing decisions of one or more users or third parties, call patterns, geographic movements (including determined patterns regarding the same), membership or participation in social networking groups, websites, or services, or user activity relating thereto, including, but not limited to, user connections (links, friends, group membership or participation), user activity relating to such social networking websites (current or historical user browsing, requests, acceptance or rejections relating to friends, links, groups, or advertisements, user posts (including status posts), internet or communication browsing activity or history, including such activity or history on the same or a different user or user associated device (e.g. mobile phone, land line telephone, VOIP telephone, desktop computer, notebook computer, tablet computer, mobile or handheld computer, wearable computer, time piece, PDA, television, gaming system, gaming device, pointing device, remote control, GPS device, appliance, machine, terminal, vehicle or common carrier), current or historical email or text history, current or historical email or text content (including identification, cross-referencing or correlation of key words, authors and/or recipients in emails, text messages, real time text-based chatting communications such as instant messages, and the like) or determined patterns regarding any of the foregoing, etc.), or any other suitable criteria.

On a higher level, the visual alert itself may similarly comprise any suitable program, code, file, or other information necessary to implement and provide the desired call alert to the called party. Accordingly, when an image or icon has been selected by the calling party or third party or dynamically assigned by the network, the corresponding program or programs will be identified for access and forwarding along with the current corresponding communication or link thereto. Alternatively, in the event such programs, files, code etc. necessary to implement the selected image or icon are already resident on the called party's terminating equipment, i.e. CPE device such as telephone 16*e*, an activation code may be identified and forwarded to the terminating equipment along with a current corresponding communication or communication link. This information is then routed to the called party 16*e* when office 12*c* completes the call and the corresponding image or icon is enabled for display on the called party CPE device and navigable by the user to initiate the desired current communication. Such image/icon may be provisioned in advance by the calling party, communication service provider, third party, or even the called party, to be displayed for a predetermined time following call termination, the duration of the call, until a predetermined event, or until the called party deactivates it by taking appropriate action.

Any suitable CPE device may be utilized provided there is sufficient memory and display capability. In the case of icons, such a device will comprise a controller operative to navigate the icon and a processor operative to receive and provide a corresponding communication or initiate a linked remotely stored communication. Such CPE device may similarly include a storage unit for selectively storing such icons and/or communications or links thereto. In operation, a called party may thus subsequently recall a stored icon or icons (whether stored locally in the device itself or remotely in the network or a network component) as well as the corresponding communications.

Such CPE devices may also function to receive stored icons/communication links from secondary communication devices. Such secondary devices may comprise any suitable wired or wireless unit including, by way of example, and not limitation, a computer, portable navigation system, in-vehicle navigation system, in-vehicle console, vehicle, helmet, furniture, radio, personal digital assistant (PDA), telephone handset, telephone headset, smart phone, television, pager, digital camera, video camera, hand held game console, wired game console, watch, data storage device, set-top box, alarm console, media player, digital audio player, digital video player, digital video recorder, hand held digital video player, home appliance, exercise equipment, fixture, personal appliance, eye glass, printer, scanner, clock, thermostat, writing utensil, credit card, debit card, kiosk, automated teller machine, electronic vehicle key, electronic book, etc.

By way of example, but not limitation, a network provider such as AT&T, Verizon, Sprint, Vonage, Comcast, etc. may provision selected calls, text messages, instant messages, and similar communications to include delivery of an image operative to identify to a subscriber that the call or communication was placed on or routed through the corresponding network. For example, a call or message placed via AT&T might be provisioned with the famous AT&T logo. In keeping with the invention, the logo may also be provisioned as an icon that may be navigated by the subscriber or recipient to initiate a corresponding advertisement. For example, the above referenced AT&T logo (or other corporate logo, regardless of the network the call or message was placed/sent on or routed through) might be navigable (highlighted and selected, "clicked on" or physically tapped in the case of a touch screen display) by a subscriber or recipient to initiate an advertisement (e.g. text, media file, etc.) of a current promotion or discount. The advertisement may be displayed on the CPE device upon such navigation of the corresponding logo. Alternatively, such navigation may trigger an embedded hyperlink that points to and opens a current corresponding web page that comprises the desired advertisement. Still further, navigation of the icon may trigger a signal to the network or network component (or third party server or communication equipment) to generate and send a current SMS text message to the subscriber or recipient that comprises the desired advertisement.

Any suitable icon may be utilized (whether navigable directly to obtain the desired communication or by triggering a hyperlink or command to the network or network element to generate an SMS text message) depending only on the desired advertisement. For example, a CNN® icon may be generated that is navigable to obtain current news information. An ESPN® icon may be generated that is navigable to obtain current sports information. A Banana Republic® icon may be generated that is navigable to obtain a current sales promotion. A Weather Channel® icon may be generated that is navigable to obtain current local weather conditions and/or forecasts. A Dell® icon may be generated that is navigable to obtain current computer promotions. A Home Depot® icon may be generated that is navigable to obtain current home improvement product promotions.

The above icons may also be pre-loaded on a subscriber CPE device at the time of provisioning, or provided and periodically updated/deleted (along with the corresponding communications, links, etc.) by the network provider based on any suitable combination of known subscriber preferences, demographics, geographic location, time, date, etc. For example, a 40-year old male subscriber might be provided or provisioned at activation to include navigable icons to Home Depot® and Sears® whereas a 16-year old female subscriber might be provided or provisioned at activation to include icons to Hollister® and Abercrombie & Fitch®. Still further, the 40-year old male subscriber may be provided with a Home Depot® icon only on Sunday between 7 am and 10 am or if the subscriber is geographically located within 2 miles of a retail location. The 16-year old female subscriber might be provided with a Hollister® icon between noon and 3 pm on Saturday or if geographically located within ½ mile of a retail location or 100 feet of a competitor. The same icons may similarly be linked with different dynamically updatable communications based on differing demographics and geographic location. For example, both the above 40-year old male subscriber and 16-year old female subscribers may be provided or provisioned with a Gap® icon, but with vastly different linked communications (advertisements) which are believed more targeted to their interests.

By way of further example, an individual subscriber who is a tennis enthusiast may identify and select a tennis ball image to be forwarded to all or select called or calling parties to be displayed upon call or message termination. Alternatively, the subscriber may select a tennis ball image that functions as an icon and is thus navigable by the receiving party upon display to initiate a corresponding communication such as a personal greeting or informational message. The icon might similarly be provided with a hyperlink to a web page that, upon navigation by the receiving party would open the subscriber's personal weblog or "blog" such as a myspace, facebook, or twitter webpage. Yet still further, a subscriber may obtain and/or enable a "holiday" icon such as a turkey image which upon navigation would play a corresponding media file such as an animation, video or audio file providing a humorous or sincere Thanksgiving greeting. It is anticipated, of course, that such icons may be selected in advance either through the network or a web-based interface or via the network at the time of placing or receiving a call.

Still further, corporate subscribers may provision their user profiles such that all or select incoming and/or outing calls or messages include selected visual alerts such as a corporate logo or icon. For example, all calls to or from a utility company may be provisioned to receive a corresponding logo identifying the company. Further, all calls to or from Little Caesars® might be provisioned with a corresponding icon and linked and dynamically updatable advertisement which may be saved for future navigation.

Wireless Networks

Referring now to FIG. 2 of the drawings, the functionality for delivering visual alert information to a called party or message recipient in a communication system 40 including a "wireless" or mobile telephone network 42 is described. As discussed, in this preferred embodiment, the alert is provided to the called party on a call termination attempt where both parties are subscribers to a corresponding visual alert service that, at the threshold, permits the required visual alert provisioning. Again, however, it is understood that the alert provisioning system and method of the present invention may be implemented at any suitable time including, but not limited to, on a call termination attempt.

Referring still to FIG. 2, wireless network 42 further includes an HLR 56 that is populated with information relating to wireless units 44a-c that are considered "home" units to MSC 48. In operation, HLR 56 may be provisioned in advance by a user or subscriber related to wireless units 44a-c to include selected visual alerts (visual images or navigable icons) and corresponding communications to be provided to a called party. HLR 56 may similarly be provisioned by the network 42. As in the wireline network, such visual alerts may be provisioned and provided to the user at the time of set up of the calling party/messaging party termination equipment, on a call-by-call or message-by-message basis, or any other suitable time.

In keeping with the invention and discussed below, it is therefore understood that HLR 56 may be provisioned by a user (here a calling party) to provide selected visual alerts to selected called parties as part of a user's profile. Such provisioning typically would include at least a Mobile Identity Number (MIN) and/or a Mobile Directory Number (MDN) assigned to the wireless units 44a-c. These entries in HLR 56 may be made by a network administrator or other suitable person upon subscription to and set up of the wireless service.

As an example of such provisioning and operation, assume that wireless network 42 has provisioned the user profile of a calling party associated with wireless unit 44*a* to include a selected visual alert to be provided to a called party associated with telephone 16 of wireline network 10. As in the case of the landline example above, in keeping with the invention, the visual alert may be provided to a called party or user at any time including, but not limited to, at the time of call or message termination. In the example herein described, the visual alert is provided upon call termination and both parties are subscribers to the visual alert service that permits the required visual alert provisioning. The calling party 44*a* begins by placing a call (sending digits) associated with a directory number of the called party. Once the call is placed, a communication is received at the serving MSC of the calling party, here MSC 48. The call is thereafter routed in a conventional manner through access tandem 46 whereupon it is received by the serving central office 12 of telephone 16 and, preferably, an associated SSP or SSP functionality of switch 12.

Office 12 recognizes that the call is for a visual alert service subscriber and accordingly suspends call processing and launches a called party alert query. More specifically, an SSP or the SSP functionality of switch 12 detects a trigger that was set in the SSP in association with the telephone number of telephone 16. The trigger recognizes that the called party subscribes to a visual alert service. The SSP uses a suitable messaging process as discussed above in a query/response exchange with the wireless network components, here STP 52, SCP 54 and HLR 56, to obtain instructions on how to proceed with the call. More specifically, the SSP populates routing parameters in a suitable query package with routing and code specific information associated with AIN elements and services, as well as directory numbers associated with the calling party 44*a* and the called party 16.

Once accessed, the visual alert delivery service performs a database look-up via HLR 56 using the calling party telephone number to access the call alert service profile of the calling party. More specifically, the service locates and cross-references the called party directory number with a selected visual alert. Again, the association between the calling party directory number and/or name and the information corresponding to the visual alert preferences for the called party may be accomplished in any suitable way. For example, the calling party directory number or directory name may simply include the information as part of the entry as discussed above. Alternatively, the calling party directory number or directory name may serve as a pointer, flag etc. or include a pointer, flag etc. to another storage medium such as a datalog, database, table or the like. As discussed herein, the user profile may be provisioned and/or updated with such information in advance of the call termination attempt or contemporaneous with the call. Where provisioning is contemporaneous, however, it is understood that additional queries may be required to be launched to request or receive information from the calling party.

As discussed above with reference to the wireline network of FIG. 1, the query package ultimately results in a visual alert that is forwarded to the SSP 12 in a final TCAP response. The TCAP message contains instructions on how to handle the call, including the identification of a specific visual alert to be provided to the called party 16. Again, the visual alert may comprise any suitable image intended for display on a subscriber communication device, including, without limitation, any fixed or moving image such as a logo, video clip, etc. which functions to uniquely identify and/or promote the calling party, network provider or third party. Such alert may also be selected in advance or dynamically assigned by the network based on any suitable criteria such as the calling party's geographic location, the called party's geographic location, etc. The alert may similarly comprise a graphical advertising unit or an icon that, in addition to or in place of providing the identification and/or promotion functions described above, is navigable by the called party to trigger a corresponding communication such as a personal message, advertisement or public service message. Such communication may comprise any suitable form including, without limitation, a media file, text, SMS text message, or any combination thereof. Again, the communication may similarly be selected in advance or dynamically assigned based on time of the day, day of the week, the calling party's geographic location, the called party's geographic location, historical subscriber actions (e.g. purchasing decisions of one or more users or third parties, call patterns, geographic movements (including determined patterns regarding the same), membership or participation in social networking websites, groups, or services, or user activity relating thereto, including, but not limited to, user connections (links, friends, group membership or participation), user activity relating to such social networking websites (current or historical user browsing, requests, acceptance or rejections relating to friends, links, groups, or advertisements, user posts (including status posts), internet or communication browsing activity or history, including such activity or history on the same or a different user or user associated device (e.g. mobile phone, land line telephone, VOIP telephone, desktop computer, notebook computer, tablet computer, mobile or handheld computer, wearable computer, time piece, PDA, television, gaming system, gaming device, pointing device, remote control, GPS device, appliance, machine, terminal, vehicle or common carrier), current or historical email or text history, current or historical email or text history, current or historical email or text content (including identification, cross-referencing or correlation of key words, authors and/or recipients in emails, text messages, real time text-based chatting communications such as instant messages, and the like) or determined patterns regarding any of the foregoing, etc.), or any other suitable criteria.

On a higher level, the alert itself may similarly comprise any suitable program, code, file, or other information necessary to implement and provide the desired visual alert to the called party. Accordingly, when a selected image or icon has been selected by the calling party or third party or dynamically assigned by the network, the corresponding program or programs will be identified for access and forwarding along with the current corresponding communication or link thereto. Alternatively, in the event such programs, files, code etc. necessary to implement the selected image or icon are already resident on the called party's terminating equipment, i.e. communication device such as wireless units 44*a-c*, an activation code may be identified and forwarded to the terminating equipment along with a current corresponding communication or communication link. Such image/icon may be provisioned in advance by the calling party, communication service provider, third party, or even the called party, to be displayed for a predetermined time following call termination, the duration of the call, until a predetermined event, or until the called party deactivates it by taking appropriate action.

A call within wireless network 42 may be processed in much the same way following a similar call flow. For example, assume that a wireless network 42 has provisioned the user profile of a calling party associated with wireless unit 44*a* to include a selected alert to be provided to a called party associated with wireless unit 44*b* of wireless network 42 on a call termination attempt. Again, in the example herein described, both parties are understood to be subscribers to the alert service that permits the required alert provisioning. The calling party 44a begins by placing a call (sending digits) associated with a directory number of the called party 44b. Once the call is placed, a communication is received at the serving MSC 48 of the calling party, here MSC 48. The call is thereafter routed in a conventional manner through the wireless network whereupon it is received by the serving MSC of wireless unit 44b. In the example illustrated, wireless units 44a and 44b share the same serving MSC 48. It is understood, however, that in many, if not most instances, parties to the wireless communication will be served by different MSCs.

In keeping with the invention, the serving MSC 48 recognizes that the call is for a visual alert service subscriber and accordingly suspends call processing and launches a called party alert query. More specifically, MSC 48 detects a trigger that was set in the MSC in association with the telephone number of telephone 44b. The MSC 48 uses a suitable messaging process as discussed above in a query/response exchange with STP 52, SCP 54 and HLR 56, to obtain instructions on how to proceed with the call. More specifically, the MSC 48 populates routing parameters in a suitable query package with routing and code specific information as well as directory numbers associated with the calling party 44a and the called party 44b.

Once accessed, the visual alert delivery service performs a database look-up via HLR 56 using the calling party telephone number to access the visual alert service profile of the calling party. More specifically, the service locates and cross-references the called party directory number with a selected visual alert.

As discussed above, the query package ultimately results in a visual alert that is forwarded to MSC 48. The visual alert, which may include suitable programming, file or activation information is then routed to the called party 44b when MSC 48 completes the call and the visual alert is provided to the called party along with a corresponding communication or communication link.

A call placed from the wireline network 10 for delivery to a wireless unit (e.g. 44a) in the wireless network 42 would follow a similar call flow as that described immediately above. In such case, call processing would be suspended by the serving MSC 48 upon detection of a corresponding trigger, whereupon an appropriate message exchange would take place between and among MSC 48 and AIN components of the wireline network 10. The result of the communications would be the location, cross reference and forwarding of a selected call alert, and more particularly, corresponding programming, file or activation information stored in a subscriber information database such as a VAD 26 to the called party 44a.

As in the case of the wireline network, the visual alert may comprise any suitable image intended for display on a subscriber communication device, including, without limitation, any fixed or moving image such as a logo, video clip, etc. which functions to uniquely identify and/or promote the calling party, network provider or third party. Such alert may also be selected in advance or dynamically assigned by the network based on any suitable criteria such as the calling party's geographic location, the called party's geographic location, etc. The alert may similarly comprise an icon or graphical advertising unit that, in addition to or in place of providing the identification and/or promotion functions described above, is navigable by the called party to trigger a corresponding communication such as a personal message, advertisement, coupon, or public service message including, without limitation, a media file, text, SMS text message, or any combination thereof. Again, the communication may similarly be selected in advance or dynamically assigned based on time of the day, day of the week, the calling party's geographic location or geographic movements, the called party's geographic location or movements, historical subscriber actions (e.g. purchasing decisions of one or more users or third parties, call patterns, geographic movements (including determined patterns regarding the same), membership or participation in social networking websites, groups, or services, or user activity relating thereto, including, but not limited to, user connections (links, friends, group membership or participation), user activity relating to such social networking websites (current or historical user browsing, requests, acceptance or rejections relating to friends, links, groups, or advertisements, user posts (including status posts), internet or communication browsing activity or history, including such activity or history on the same or a different user or user associated device (e.g. mobile phone, land line telephone, VOIP telephone, desktop computer, notebook computer, tablet computer, mobile or handheld computer, wearable computer, time piece, PDA, television, gaming system, gaming device, pointing device, remote control, GPS device, appliance, machine, terminal, vehicle or common carrier), current or historical email or text history, current or historical email or text history, current or historical email or text content (including identification, cross-referencing or correlation of key words, authors and/or recipients in emails, text messages, real time text-based chatting communications such as instant messages, and the like) or determined patterns regarding any of the foregoing, or any other suitable criteria.

Again, any suitable wireless unit or device may be utilized provided there is sufficient memory and display capability. In the case of icons, such a device will comprise a controller operative to navigate the icon and a processor operative to receive and provide a corresponding communication or initiate a linked remotely stored communication. Such wireless device may similarly include a storage unit for selectively storing such icons and/or communications or links thereto. In operation, a called party may thus subsequently recall a stored icon or icons (whether stored locally in the device itself or remotely in the network or a network component) as well as the corresponding communications.

Such icons and communications may similarly be automatically updated or deleted following predetermined times or events to ensure that stored icons correspond to the most current advertisement or public service message.

Any suitable icon may be utilized (whether navigable directly to obtain the desired communication or by triggering a hyperlink or command to the network or network element to generate an SMS text message) depending only on the desired advertisement. Such icons may also be pre-loaded on a subscriber wireless device at the time of provisioning, or provided and periodically updated/deleted (along with the corresponding communications, links, etc.) by the network provider based on known subscriber preferences, demographics, location, day, date, time, movement, etc. The same icons may similarly be provisioned or provided with different dynamically updatable communications based on differing demographics as well as location. For example, a retailer may desire that selected subscribers (e.g., those of a desired age, purchase history and/or geographic vicinity of a select retail location) be provided with identifying icons and/or targeted advertisements to promote specific merchandise.

As in the case of wireline systems discussed above, subscribers may also identify and select personalized images/icons to be provided to called parties. Such icons may be navigated to initiate personalized messages, greetings, links to personal weblogs, etc.

Provisioning for Called Party Selected Visual Alerts

Wireline Networks

Referring again to FIG. 1 of the drawings, the functionality for delivering alert information to a calling party will be described. As discussed above, FIG. 1 illustrates an exemplary embodiment including a subscriber information database 26 as a preferred source of information. In this preferred embodiment, the alert is provided to the calling party on a call termination attempt where both parties are subscribers to a corresponding visual alert service that, at the threshold, permits the required alert provisioning. Again, however, it is understood that the alert provisioning system and method of the present invention may be implemented at any suitable time including, but not limited to, on a call termination attempt.

In operation, database 26 may be provisioned (i.e "populated") in advance by a user or subscriber related to a telephone 16a-f to include selected visual alerts to be provided to a calling party on a call or message termination attempt or any other suitable time. Such calling alert may be provisioned at the time of set up of the called party termination equipment, on a call-by-call basis, or any other suitable time. In keeping with the invention and discussed below, it is therefore understood that database 26 may be provisioned by the network, or a user (here a called party) to provide selected visual alerts to selected calling parties as part of a user's profile.

As an example of such provisioning and operation, assume that a called party or "user" associated with telephone 16e has provisioned the user's profile to include a selected visual alert to be provided to a user or calling party associated with telephone 16a. In the example herein described, such visual alert is provided on a call termination attempt and both parties are subscribers to a corresponding visual alert service that, at the threshold, permits the required visual alert provisioning. The calling party 16a begins by placing a call (sending digits) associated with a directory number of the called party. Once the call is placed, a communication is received at the serving central office and or SSP, of the calling party, here central office switch 12a. Central office 12a, and more particularly, an associated SSP or SSP functionality of switch 12a obtains routing information and populates an Initial Address Message (IAM) with selected information. Again, as indicated above, the IAM is a parameter that exists within an Integrated Services Digital Network User Part (ISUP) signaling message. Specifically, the IAM is populated with the calling party directory number and the called party directory number.

Central office 12a sends this information in the signaling message to an end office 12e serving telephone 16e and thus the called party associated with telephone 16e. Office 12e recognizes that the call is for a visual alert service subscriber and, accordingly, halts or "suspends" call processing and launches a called party alert query on the CCS7 network 10. More specifically, an SSP or the SSP functionality of switch 12e detects a trigger that was set in the SSP in association with the telephone number of telephone 16e (i.e. the called telephone number). The trigger recognizes that the called party subscribes to a calling alert service. Regardless of how the SSP trigger is implemented and/or detected, the SSP functions to launch a query (a "calling party alert" query) via a serving STP, here STP 18 to an associated network element such as SCP 20, for instructions on how to proceed with the call. More specifically, the SSP populates routing parameters in a suitable query package with routing and code specific information associated with AIN elements and services, as well as directory numbers associated with the calling party 16a and the called party 16e. As part of the query launch, central office 16e populates a called party address parameter in the query with the calling party's directory number.

After office 12e has populated the called party address parameter, the calling party alert query is sent to STP 18. Upon receipt of the above discussed query package (including all relevant routing parameters), STP 18 reformats the package with final routing information. More specifically, STP 18 performs a Global Title Translation (GTT) and changes the DPC of the message so that the query package is routed to the appropriate SCP, here SCP 22. The STP 18 may also change a Subsystem Number (SSN) to enable a specific service package (e.g. the calling alert service package) to be accessed within a subsystem of the SCP 22. In the preferred embodiment illustrated in FIG. 1, the SSN is changed so that the visual alert service of the present invention is accessed when the SCP 22 receives the above query package. Once accessed, the visual alert delivery service performs a database look-up via CAD 26 using the called party telephone number to access the calling alert service profile of the called party. More specifically, the service locates and cross-references the calling party directory number with a selected visual alert. The association between the called party directory number and/or name and the information corresponding to the calling alert preferences for the calling party may be accomplished in any suitable way. For example, the called party directory number or directory name may simply include the information as part of the entry as discussed above. Alternatively, the called party directory number or directory name may serve as a pointer, flag etc. or include a pointer, flag etc. to another storage medium such as a datalog, database, table or the like.

In keeping with the invention, after the STP 18 performs the GTT, the query package is sent to the SCP 22. The SCP 20 sends a calling alert message to the SSP 12a in a TCAP response. The TCAP response is the final message containing instructions on how to handle the call and ends the SSP/SCP transaction that was initiated with the call alert query. In the example discussed, the TCAP response includes the identification of a specific visual alert to be provided to the calling party 16a.

As discussed above the visual alert may comprise any suitable image intended for display on a subscriber communication device, including, without limitation, any fixed or moving image such as a logo, video clip, etc. which functions to uniquely identify and/or promote the calling party, network provider or third party. Such alert may also be selected in advance or dynamically assigned based on any suitable criteria such as the calling party's geographic location, the called party's geographic location, etc. The alert may similarly comprise a graphical advertising unit or an icon that, in addition to or in place of providing the identification and/or promotion functions described above, is navigable by the called party to trigger a corresponding communication such as a personal message, advertisement or public service message. Such communication may comprise any suitable form including, without limitation, a media file, text, SMS text message, or any combination thereof. Again, the communication may similarly be selected in advance or dynamically assigned based on time of the day, day of the week, the calling party's geographic location, the called party's geographic location, historical subscriber actions, purchasing decisions of one or more users or third parties, geographic movement, including determined patterns regarding the same, membership or participation in social networking websites or user activity relating thereto, including, but not limited to, user connections (links, friends, group membership or participation), user activity relating to such social networking websites (current or historical user browsing, requests, acceptance or rejections relating to friends, links, groups, or advertisements, user posts (including status posts), internet or communication browsing activity or history, including such activity or history on the same or a different user or user associated device (e.g. mobile phone, land line telephone, VOIP telephone, desktop computer, notebook computer, tablet computer, mobile or handheld computer, wearable computer, time piece, PDA, television, gaming system, gaming device, pointing device, remote control, GPS device, appliance, machine, terminal, vehicle or common carrier), current or historical email or text history, current or historical email or text history, current or historical email or text content (including identification, cross-referencing or correlation of key words, authors and/or recipients in emails, text messages, real time text-based chatting communications such as instant messages, and the like) or determined patterns regarding any of the foregoing, or any other suitable criteria applied to the subscribers or the author of the communication.

The visual alert itself may similarly comprise any suitable program, code, file, or other information necessary to implement and provide the desired call alert to the called party. Accordingly, when a selected image or icon has been selected by the calling party or third party or dynamically assigned by the network, the corresponding program or programs will be identified for access and forwarding along with the current corresponding communication or link thereto. Alternatively, in the event such programs, files, code etc. necessary to implement the selected image or icon are already resident on the called party's terminating equipment, i.e. CPE device such as telephone 16*e*, an activation code may be identified and forwarded to the terminating equipment along with a current corresponding communication or communication link. This information is then routed to the called party 16*e* when office 12*c* completes the call and the corresponding image or icon is enabled for display on the called party CPE device and navigable by the user to initiate the desired current communication. Such image/icon may be provisioned in advance by the calling party, communication service provider, third party, or even the called party, to be displayed for a predetermined time following call termination, the duration of the call, until a predetermined event, or until the called party deactivates it by taking appropriate action.

Wireless Networks

Referring again to FIG. 2 of the drawings, the functionality for delivering visual alert information to a calling party in a communication system including a wireless network will be described. As discussed, in this preferred embodiment, the alert is provided to the calling party on a call termination attempt where both parties are subscribers to a corresponding visual alert service that, at the threshold, permits the required visual alert provisioning. Again, however, it is understood that the alert provisioning system and method of the present invention may be implemented at any suitable time including, but not limited to, on a call termination attempt Wireless network 42 includes an HLR 56 that is populated with information relating to wireless units 44*a-c* that are considered "home" units to MSC 48. In operation, HLR 56 may be provisioned in advance by a user or subscriber related to wireless units 44*a-f* to include selected visual alerts to be provided to a calling party on a call termination attempt. As in the wireline network, such visual alert information may be provisioned at the time of set up of the called party termination equipment, on a call-by-call or message-by-message basis, or any other suitable time.

In keeping with the invention and discussed below, it is understood that HLR 56 may be provisioned by a user (here a called party) to provide selected visual alerts to selected calling parties as part of a user's profile. Such provisioning typically would include at least a Mobile Identity Number (MIN) and/or a Mobile Directory Number (MDN) assigned to the wireless unit 44*a-c*. These entries in HLR 56 may be made by a network administrator or other suitable person upon subscription to the wireless service.

As an example of such provisioning and operation, assume that a user or prospective "called party" associated with telephone 16*a* of wireline network 10 has provisioned his user profile to include a selected visual alert to be provided to a calling party associated with wireless unit 44*a* of wireless network 42. Again, as in the case of the landline example above, the visual alert may be provided to the user at any time, including, but not limited to, on a call termination attempt. In the example herein described, the visual alert is provided on a call termination attempt and both parties are subscribers to the calling alert service. The calling party 44*a* begins by placing a call (sending digits) associated with a directory number of the called party 16. Once the call is placed, a communication is received at the serving MSC of the calling party, here MSC 48. The call is thereafter routed in a conventional manner through access tandem 46 whereupon it is received by the serving central office 12 of telephone 16 and, more particularly, an associated SSP or SSP functionality of switch 12.

Office 12 recognizes that the call is for a visual alert service subscriber and accordingly suspends call processing and launches a calling party alert query. More specifically, an SSP or the SSP functionality of switch 12 detects a trigger which was set in the SSP in association with the telephone number of telephone 16. The trigger recognizes that the calling party subscribes to a visual alert service. The SSP uses a suitable messaging process as discussed above in a query/response exchange with the wireless network components, here STP 52, SCP 54 and HLR 56, to obtain instructions on how to proceed with the call. More specifically, the SSP populates routing parameters in a suitable query package with routing and code specific information associated with AIN elements and services, as well as directory numbers associated with the calling party 44*a* and the called party 16.

Once accessed, the visual alert delivery service performs a database look-up via HLR 56 using the called party telephone number to access the calling alert service profile of the called party. More specifically, the service locates and cross-references the calling party directory number with a selected visual alert. Again, the association between the calling party directory number and/or name and the information corresponding to the calling alert preferences for the called party may be accomplished in any suitable way.

As discussed above with reference to the wireline network of FIG. 1, the query package ultimately results in a visual alert that is forwarded to the SSP 12 in a final TCAP response. The TCAP message contains instructions on how to handle the call, including the identification of a specific calling alert to be provided to the calling party 44*a*. Again, As discussed above the visual alert may comprise any suitable image intended for display on a subscriber communication device, including, without limitation, any fixed or moving image such as a logo, video clip, etc. which functions to uniquely identify and/or promote the calling party, network provider or third party. Such alert may also be selected in advance or dynamically assigned based on any suitable criteria such as the calling party's geographic location, the called party's geographic location, etc. The alert may similarly comprise an icon that, in addition to or in place of providing the identification and/or promotion functions described above, is navigable by the called party to trigger a corresponding communication such as a personal message, advertisement, coupon, or public service message. Such communication may comprise any suitable form including, without limitation, a media file, text, SMS text message, or any combination thereof. Again, the communication may similarly be selected in advance or dynamically assigned based on time of the day, day of the week, the calling party's geographic location, the called party's geographic location, historical subscriber actions, purchasing decisions of one or more users or third parties, geographic movement, including determined patterns regarding the same, membership or participation in social networking websites or user activity relating thereto, including, but not limited to, user connections (links, friends, group membership or participation), user activity relating to such social networking websites (current or historical user browsing, requests, acceptance or rejections relating to friends, links, groups, or advertisements, user posts (including status posts), internet or communication browsing activity or history, including such activity or history on the same or a different user or user associated device (e.g. mobile phone, land line telephone, VOIP telephone, desktop computer, notebook computer, tablet computer, mobile or handheld computer, wearable computer, time piece, PDA, television, gaming system, gaming device, pointing device, remote control, GPS device, appliance, machine, terminal, vehicle or common carrier), current or historical email or text history, current or historical email or text content (including identification, cross-referencing or correlation of key words, authors and/or recipients in emails, text messages, real time text-based chatting communications such as instant messages, and the like) or determined patterns regarding any of the foregoing, or any other suitable criteria. This information is then routed to the calling party 44*a* when office 12 completes the call and the visual alert information is provided to the calling party.

A call within wireless network 42 may be processed in much the same way following a similar call flow. For example, assume that a user or "called party" associated with wireless unit 44*b* of wireless network 42 has provisioned his user profile to include a selected calling alert to be provided to a calling party associated with wireless unit 44*a* of wireless network 42. Again, the visual alert may be provided to a user at any suitable time including, but not limited to, on a call termination attempt. In the example herein described, the visual alert is provided on a call termination attempt and both parties are understood to be subscribers to the calling alert service. The calling party 44*a* begins by placing a call (sending digits) associated with a directory number of the called party 44*b*. Once the call is placed, a communication is received at the serving MSC of the calling party, here MSC 48. The call is thereafter routed in a conventional manner through the wireless network whereupon it is received by the serving MSC of wireless unit 44*b*. In the example illustrated, wireless units 44*a* and 44*b* share the same serving MSC 48. It is understood, however, that in many, if not most instances, parties to the wireless communication will be served by different MSCs.

In keeping with the invention, the serving MSC recognizes that the call is for a visual alert service subscriber and accordingly suspends call processing and launches a calling party alert query. More specifically, MSC detects a trigger that was set in the MSC in association with the telephone number of telephone 44*b*. The trigger recognizes that the called party subscribes to a visual alert service. The MSC uses a suitable messaging process as discussed above in a query/response exchange with STP 52, SCP 54 and HLR 56, to obtain instructions on how to proceed with the call. More specifically, the MSC populates routing parameters in a suitable query package with routing and code specific information as well as directory numbers associated with the calling party 44*a* and the called party 44*b*.

Once accessed, the visual alert delivery service performs a database look-up via HLR 56 using the called party telephone number to access the visual alert service profile of the called party. More specifically, the service locates and cross-references the calling party directory number with a selected visual alert.

As discussed above, the query package ultimately results in a calling alert that is forwarded to MSC 48. The visual alert, that may include suitable programming, file or activation information, is then routed to the calling party 44*a* when MSC 48 completes the call and the visual alert is provided to the calling party along with a corresponding communication or link thereto. Such alert may also be selected in advance or dynamically assigned based on any suitable criteria such as the calling party's geographic location, the called party's geographic location, etc. The alert may similarly comprise an icon that, in addition to or in place of providing the identification and/or promotion functions described above, is navigable by the called party to trigger a corresponding communication such as a personal message, advertisement or public service message. Such communication may comprise any suitable form including, without limitation, a media file, text, SMS text message, or any combination thereof. Again, the communication may similarly be selected in advance or dynamically assigned based on time of the day, day of the week, the calling party's geographic location, the called party's geographic location, historical subscriber actions, purchasing decisions of one or more users or third parties, geographic movement, including determined patterns regarding the same, membership or participation in social networking websites or user activity relating thereto, including, but not limited to, user connections (links, friends, group membership or participation), user activity relating to such social networking websites (current or historical user browsing, requests, acceptance or rejections relating to friends, links, groups, or advertisements, user posts (including status posts), internet or communication browsing activity or history, including such activity or history on the same or a different user or user associated device (e.g. mobile phone, land line telephone, VOIP telephone, desktop computer, notebook computer, tablet computer, mobile or handheld computer, wearable computer, time piece, PDA, television, gaming system, gaming device, pointing device, remote control, GPS device, appliance, machine, terminal, vehicle or common carrier), current or historical email or text history, current or historical email or text content (including identification, cross-referencing or correlation of key words, authors and/or recipients in emails, text messages, real time text-based chatting communications such as instant messages, and the like) or determined patterns regarding any of the foregoing, or any other suitable criteria A call placed from the wireline network 10 for delivery to a wireless unit (e.g. 44*a*) in the wireless network 42 would follow a similar call flow as that described immediately above. In such case, call processing would be suspended by the serving MSC 48 upon detection of a corresponding trigger, whereupon an appropriate message exchange would take place between and among MSC 48 and AIN components of the wireline network 10. The result of the communications would be the location, cross reference and forwarding of a selected visual alert, and more particularly, corresponding programming, file or activation information stored in a subscriber information database such as a CAD 26 to the called party 44*a*.

As will be understood by those skilled in the art, the aforementioned visual alerts may be stored as computer programs or other suitable instructions, files or code which function to tell a corresponding processing unit in the communication device (not shown) what the communication device should do. Such information may accordingly be stored in whole or in part in a suitable memory element or elements of the communication device and/or corresponding network elements. Similarly, the information may be processed in a suitable processor or processing unit or units such as a CPU in the communication device or in combination with additional network elements or other communication devices having appropriate processing functionality. As discussed herein, such processing may comprise selection and provision of the selected program, file etc. to a called or calling. Still further, processing in accordance with the invention may comprise user blocking of a visual alert selected by the network or a sending party.

As will be described with reference to the logic diagrams of FIGS. 3-4 below, regardless of the storage and/or processing locations, the corresponding programs may be selected and directed for playback/blocking at the desired communication device. Where the program itself is already resident on the desired device (for example, pre-loaded at the time of manufacture, or otherwise obtained), the program need only be activated (or inactivated) for the desired call. Where the program is not resident on the desired device, the method and system of the present invention functions to forward or block the program or programs or other suitable instructions or code to the desired device whereupon it is likewise activated as the requested visual alert (or blocked in accordance with the user's request).

The invention described herein may similarly be implemented for use in a GPS network or system for delivering visual alerts, including navigable visual alerts and corresponding communications of the type described above, to corresponding GPS receivers and/or other communication devices. As those skilled in the art will recognize, the basic function of a GPS receiver is to pick up radio transmissions of multiple earth orbiting satellites (usually at least 4) and combine the information in the transmissions with information in an electronic almanac to determine the receiver's geographic position. Once the receiver completes this calculation, it may provide latitude, longitude and altitude or similar measurement of its current position. To make the navigation user-friendly, most receivers plug this raw data into mapping files stored in memory and provide a graphical output on a corresponding display or GUI. The GPS receiver and/or display may, of course, be integral with a vehicle or a portable hand-held device.

The above GPS radio signals typically comprise 2 microwave carrier signals. The L1 frequency (1575.42 MHz) carries the navigation message and the SPS (Standard Positioning System) code signals. The L2 frequency (1227.60 MHz) is used to measure the ionospheric delay by PPS (Precise Positioning Service) equipped receivers. The GPS Navigation Message consists of time-tagged data bits marking the time of transmission of each sub-frame at the time they are transmitted by the satellite. The specific details of the foregoing are well known to those of skill in the art and, accordingly, will not be discussed in further detail.

In keeping with the invention, visual alerts may therefore be provided for display on a GPS receiver. Such alerts may be provided as part of the above-described navigation messages and provisioned based on any suitable criteria including, of course, the receiver's geographic position. The alerts may further comprise navigable icons that may be linked to corresponding communications. Such icons may be provided at the time of set-up as part of the user's profile or dynamically provisioned based on suitable criteria. The corresponding communications may similarly be dynamically provisioned based on suitable criteria including location. The visual alerts may be selected and provided by the navigation system provider or any third party.

By way of example, a GPS receiver may be pre-loaded or provisioned with a Weather Channel® icon, ESPN® icon, CNN® icon etc. that may be navigable by the user to generate a corresponding message for display on the GPS device. Such communication may comprise text, video, an audio file, a media file, etc. Still further, navigation of the icon may generate an SMS text message for display on the GPS receiver or a predetermined secondary communication device such as a wireless telephone. In the case of advertisements, it may, in fact, be preferable to forward the communication or a supplemental communication directly to the secondary device. For example, a navigable Starbucks® icon may be provisioned by the GPS service provider for display on a GPS receiver based on the proximity of the receiver to a known retail location to prompt the user to consider a purchase. Once navigated, the icon would trigger generation of a corresponding communication for display on the GPS receiver regarding a current beverage promotion. An SMS text message may also be generated for receipt by a predetermined wireless telephone known to be associated with the registered user of the GPS receiver. Such SMS text message may include a coupon code necessary for the user to receive the identified discount or promotion. Because many GPS receivers are either mounted or provided integral with a vehicle, delivery of a communication to a secondary portable communication device may be desirable so the user may have a corresponding coupon code in hand when visiting the retailer. Of course, any suitable communication may be provided to the GPS receiver and/or secondary device including, without limitation, the aforementioned SMS text message, as well as audio files, media files, text, embedded hyperlinks, etc.

Figure 3:
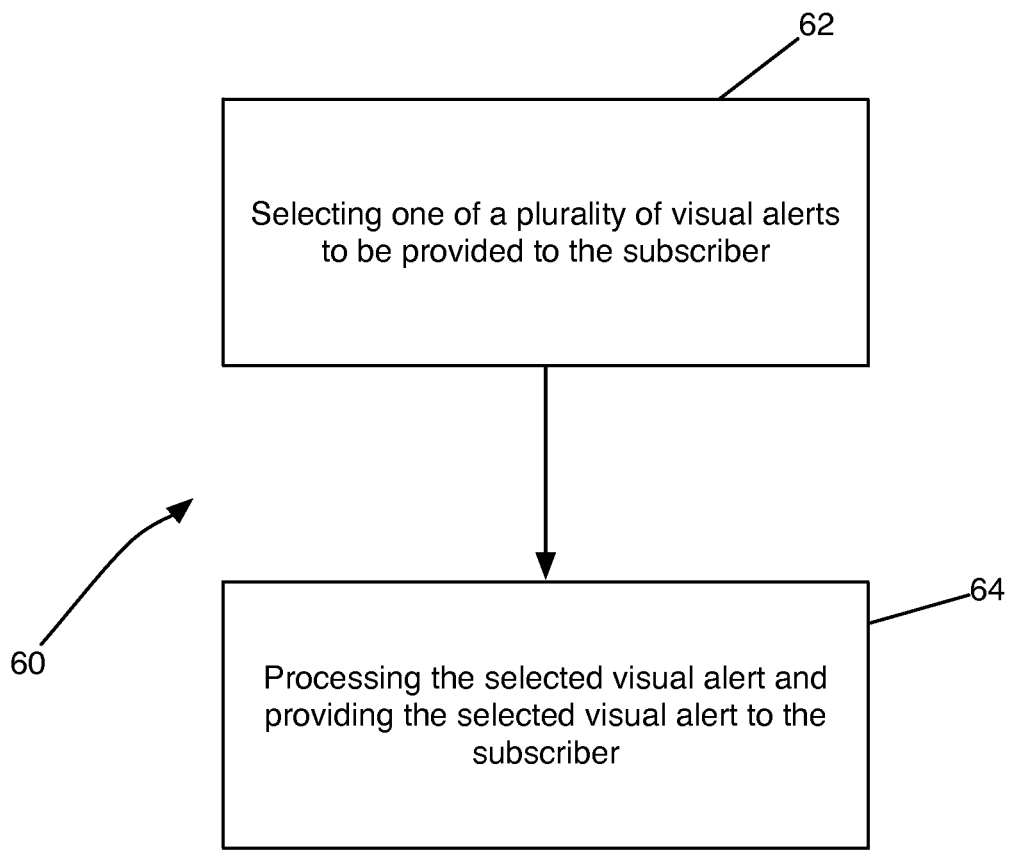
FIGS. 3-5 are flow diagrams of the method steps of one embodiment of the present invention.
Figure 4:
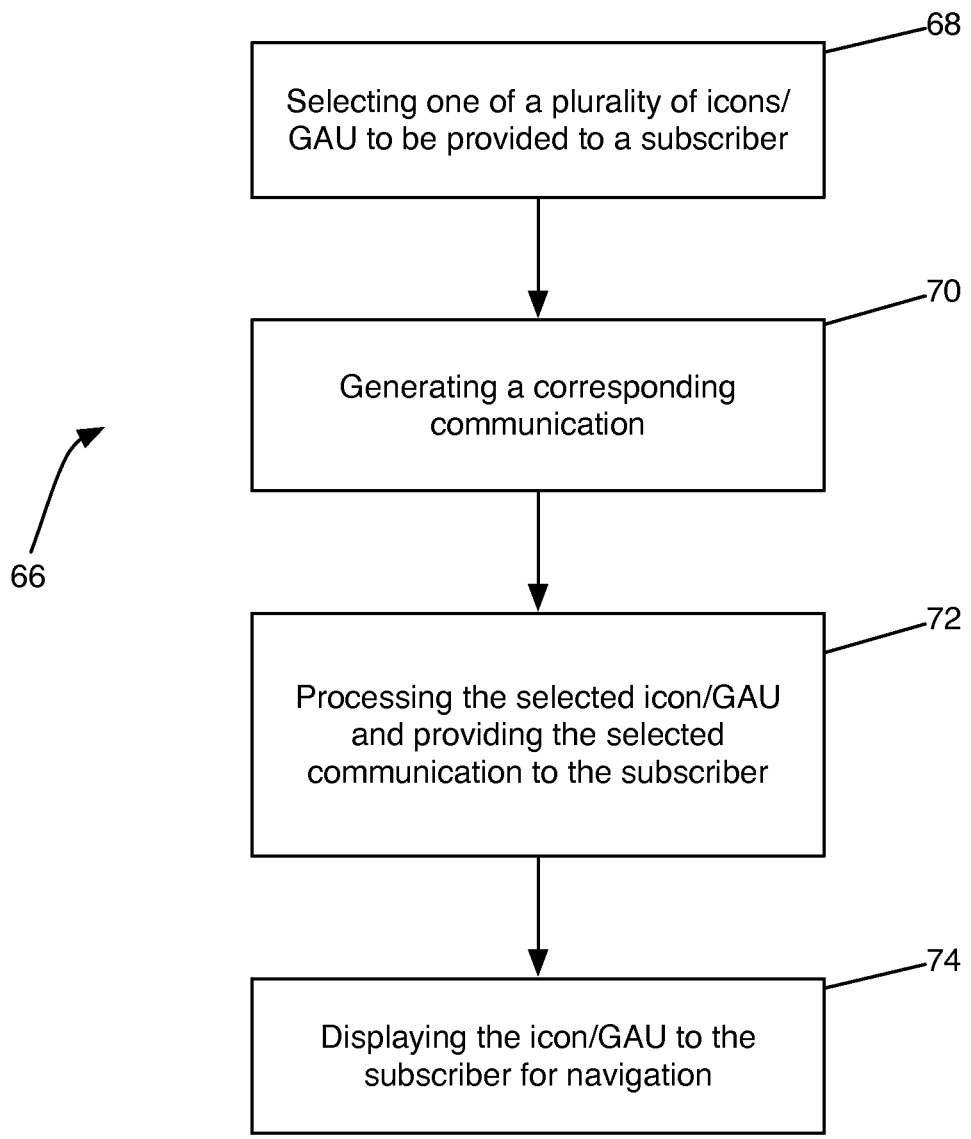
Figure 5:
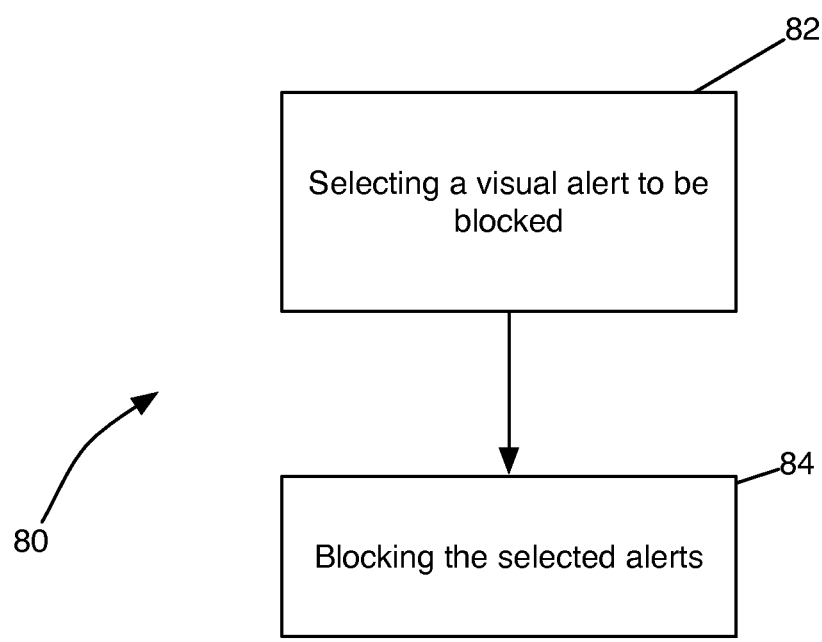

Turning now to FIGS. 3-5, there is illustrated flow diagrams of preferred embodiments of the method steps of the present invention. As shown in FIG. 3, and designated generally be reference numeral 60, the method is specifically directed for use in a communication network such as a wired or wireless telephone network, GPS system, etc. for providing a selected visual alert to a subscriber. The method comprises selecting 62 one of a plurality of visual alerts to be provided to the subscriber. The method further comprises processing 64 the selected visual alert and providing the selected visual alert to the subscriber for display on a subscriber communication device. As shown in FIG. 4 and designated generally by reference numeral 66, the method is further directed for use in a communication network for providing a selected navigable graphical advertising unit or icon to a subscriber. Accordingly, the method comprises selecting 68 one of a plurality of icons or graphical advertising units to be provided to the calling party. The method further comprises generating 70 a corresponding communication. Still further, the method comprises processing 72 the selected icon or graphical advertising unit and providing the selected communication to the subscriber. Finally, the method comprises displaying 74 the icon or graphical advertising unit to the subscriber wherein the subscriber may navigate the same to initiate and/or store the corresponding communication.

Still further, as shown in FIG. 5 and designated generally by reference numeral 80, the method is directed to providing a subscriber the ability to block a visual alert. The method comprises selecting 82 a visual alert to be blocked and blocking 84 the selected alerts.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An alert system for use in a mobile telecommunications network for providing targeted mobile advertisements to network subscribers, the system comprising:
   a database including (a) position information of selected subscriber wireless units operating in the network, and (b) subscriber profile information, including for each selected subscriber, subscriber preferences for receiving mobile advertisements of third parties;
   a service node in communication with the database and operable to automatically generate alerts in real time for receipt by the selected network subscribers based on their corresponding subscriber profile and distribution criteria set by the network provider and/or one or more third parties, the distribution criteria including (a) wireless unit position, (b) proximity to a geographic reference point of (i) a predefined group of network subscribers, and/or (ii) a predetermined amount of network subscribers; and (c) data transmissions sent or received by the subscriber on an associated device or system; and
   a processor in communication with the service node for automatically providing the alerts to the corresponding subscriber wireless units;
   wherein the alerts are automatically displayable on each wireless unit as unique corresponding logos or graphical advertising units of each such third party, and wherein each alert may be ignored or selectively navigated by the subscriber to initiate and subsequently provide a corresponding advertisement, and wherein each such advertisement is specifically targeted to the subscriber at the time of navigation based on the corresponding subscriber profile and distribution criteria.

2. An alert system as in claim 1, wherein the data transmissions comprise subscriber web browsing history.

3. An alert system as in claim 1, wherein the data transmissions comprise content of select email, text messages, and instant messages.

4. An alert system as in claim 1, wherein the proximity to a geographic reference point comprises historical or predicted proximity.

5. An alert system as in claim 1, wherein each alert may be voice-navigated using an artificial intelligence application and natural language processing.

6. An alert system for use in a mobile telecommunications network for providing targeted mobile advertisements to network subscribers, the system comprising:
   a database including (a) position information of selected subscriber wireless units operating in the network, and (b) subscriber profile information, including for each selected subscriber, subscriber preferences for receiving mobile advertisements of third parties;
   a service node in communication with the database and operable to automatically generate alerts in real time for receipt by the selected network subscribers based on their corresponding subscriber profile and distribution criteria set by the network provider and/or one or more third parties, the distribution criteria including (a) wireless unit position, (b) proximity to a geographic reference point of (i) a predefined group of network subscribers, and/or (ii) a predetermined amount of network subscribers; and (c) subscriber membership or participation in social networking groups and services, including subscriber connections and content of messages posted or received by the subscriber;
   a processor in communication with the service node for automatically providing the alerts to the corresponding subscriber wireless units;
   wherein the alerts are automatically displayable on each wireless unit as unique corresponding logos or graphical advertising units of each such third party, and wherein each alert may be ignored or selectively navigated by the subscriber to initiate and subsequently provide a corresponding advertisement, and wherein each such advertisement is specifically targeted to the subscriber at the time of navigation based on the corresponding subscriber profile and distribution criteria.

7. An alert system as in claim 6, wherein each alert may be voice-navigated using an artificial intelligence application and natural language processing.

8. An alert system for use in a mobile telecommunications network for providing targeted mobile messages to network subscribers, the system comprising:
   a database including (a) position information of selected subscriber wireless units operating in the network, and (b) subscriber profile information, including for each selected subscriber, subscriber preferences for receiving mobile messages;
   a service node in communication with the database and operable to automatically generate alerts in real time for receipt by the selected network subscribers based on their corresponding subscriber profile and distribution criteria set by the subscriber, the network provider and/or one or more third parties, the distribution criteria including (a) wireless unit position, and (b) proximity to a geographic reference point of (i) a predefined group of network subscribers, and/or (ii) a predetermined amount of network subscribers; and
   a processor in communication with the service node for automatically providing the alerts to the corresponding subscriber wireless units;
   wherein the alerts are automatically displayable on each wireless unit as unique corresponding logos, and wherein each alert may be ignored or selectively navigated by the subscriber to initiate and subsequently provide a corresponding message or advertisement, and wherein each such message or advertisement is specifically targeted to the subscriber at the time of navigation based on the corresponding subscriber profile and distribution criteria, and
   wherein the geographic reference point is not fixed.

9. An alert system as in claim 8, wherein each alert may be voice-navigated using an artificial intelligence application and natural language processing.

10. An alert system as in claim 9, wherein the corresponding alert and/or message may be stored on the wireless unit for subsequent retrieval and display.

* * * * *